(12) United States Patent
Betz et al.

(10) Patent No.: US 6,558,611 B1
(45) Date of Patent: May 6, 2003

(54) METHOD FOR PRODUCING CERAMIC FOILS

(75) Inventors: Thomas Betz, Weiden (DE); Thomas Frey, Lauf a. d. Pegnitz (DE); Anette Haubenreich, Nürnberg (DE); Franz Koppe, Eschenbach (DE)

(73) Assignee: Firma Kerafol Keramische Folien GmbH, Eschenbach (DE)

( * ) Notice: Subject to any disclaimer, the term of this patent is extended or adjusted under 35 U.S.C. 154(b) by 0 days.

(21) Appl. No.: 09/531,931

(22) Filed: Mar. 21, 2000

(30) Foreign Application Priority Data

Mar. 30, 1999 (DE) .......................................... 199 14 330

(51) Int. Cl.7 ............................................ C04B 35/634
(52) U.S. Cl. ...................... 264/650; 264/660; 264/669; 264/670; 264/166
(58) Field of Search ................................ 264/650, 669, 264/670, 660, 166

(56) References Cited

U.S. PATENT DOCUMENTS

| 2,952,877 | A | * | 9/1960 | Park |
| 3,004,197 | A | * | 10/1961 | Rodriquez et al. |
| 3,472,803 | A | * | 10/1969 | Andrews et al. |
| 3,998,917 | A | * | 12/1976 | Adelman ..................... 264/650 |
| 4,663,231 | A | * | 5/1987 | Girgis et al. ................. 428/378 |
| 4,968,460 | A | * | 11/1990 | Thompson et al. ............. 264/6 |
| 5,194,296 | A | * | 3/1993 | Hammer et al. ............. 427/177 |
| 5,368,795 | A | | 11/1994 | Quadir |
| 5,498,382 | A | * | 3/1996 | Seitz ............................. 264/6 |

* cited by examiner

*Primary Examiner*—James Derrington
(74) *Attorney, Agent, or Firm*—Kenyon & Kenyon

(57) ABSTRACT

A method for producing ceramic bodies, particularly ceramic foils, from a castable slip made of a dispersion of a ceramic powder in a solvent. A dispersion of an aqueous vinyl-acetate homopolymer or an aqueous vinyl-acetate/ethene copolymer being used as the solvent.

16 Claims, No Drawings

METHOD FOR PRODUCING CERAMIC FOILS

BACKGROUND OF THE INVENTION

1. Field of the Invention

The invention relates to a method for manufacturing ceramic foils from a castable slip made of a dispersion of a ceramic powder in a solvent.

2. Description of Related Art

Ceramic materials are being used more and more to produce articles which are thermally and chemically resistant, have a light weight or are even intended to be used as insulation. When producing the ceramic articles, first a green body is produced from a castable slip by drying, a "white body" being formed from the green body by baking thoroughly. The white bodies are sintered, resulting in a sintered compact of great strength which can be used, for example, in the field of information energy and electronic engineering.

To produce a castable slip, generally a ceramic powder is suspended in organic solvents together with necessary chemical additives such as liquefiers, binders and plasticizers. A dispersion results, from which a solid ceramic article is produced by drying, burning and sintering, the initial polymer bond being replaced by a polycrystalline ceramic bond. The polymers used for the dispersion are thermally decomposed during the thermal treatment and escape as a vapor or gas.

When producing the castable slip, selected polymers are dissolved with organic solvents and the ceramic powder is dispersed therein. In so doing, the ceramic powder is distributed as homogeneously as possible. The percentage of ceramic in the dispersion is between 30 and 85 percentage by weight, depending on the area of application and the desired properties of the ceramic body. The other portions of the dispersion include the polymer binder, the organic solvent, and possibly added auxiliary agents such as dispersing agents, defoaming agents and plasticizers which are intended to improve the castability and flexibility of the foils.

For example, to produce "green foils", the castable slip is poured out in as constant a thickness as possible onto a solid base. The slip is thereupon conveyed through a drying tunnel and the solvent is steamed out. The dispersion is thickened and dried, so that at the end of the drying tunnel, only the ceramic powder with the polymer and possibly intermingled auxiliary agents remains. The result is a flexible polymer foil having a very high filling ratio of ceramic powder.

One problem with ceramic foils produced in this manner is the use of the organic solvent. In light of environmental protection as well as explosion protection, they demand increased expenditure from the standpoint of process engineering. Thus, a number of organic solvents must not be released into the environment, making it necessary to design the drying installation as a recycling system, i.e., including filter equipment with subsequent waste disposal. In addition, because of the increased flammability and the low flame and explosion temperatures of the organic solvents, increased expenditure for equipment in the technical production installation is necessary, especially with respect to protection against explosion. The sometimes existing toxicity of the organic solvents also requires increased industrial safety for their processing and for the people coming in contact with them.

SUMMARY OF THE INVENTION

It is an object of the invention to avoid the above-indicated problems when producing ceramic bodies, particularly ceramic foils. This and other objects of the invention are achieved by a method for producing ceramic bodies, particularly ceramic foils, from a castable slip made of a dispersion of a ceramic powder in a solvent, wherein a dispersion of an aqueous vinyl-acetate homopolymer or an aqueous vinyl-acetate/ethene copolymer is used as a solvent.

DETAILED DESCRIPTION OF THE INVENTION

Surprisingly, it was found that a solvent made of a dispersion of an aqueous vinyl-acetate homopolymer or an aqueous vinyl-acetate/ethene copolymer mixed with a ceramic powder yields a very good, highly homogeneous dispersion, from which green foils can be produced that are crack-free, non-porous and non-warping. The dispersion, based purely upon water, yields an environmentally friendly method without organic solvents and a versatilely usable binder component for the ceramic bodies. Furthermore, the vinyl-acetate/ethene copolymer dispersion in particular allows variable adjustment of the flexibility and strength of the foils to be produced. Thus, the monomer ratio of vinyl acetate to ethene can be varied within a wide range, preferably from 95:5 to 75:25. A higher portion of ethene yields a softer product, while a higher portion of vinyl acetate yields a harder product.

It has also turned out that the dispersion can be produced with a high solids content. Thus, it is possible to produce an aqueous dispersion having a polymer constituent of 5 to 25 percentage by weight relative to the total solids content. The ceramic content of the slip is very highly adjustable due to the low inherent viscosity of the dispersion, which results in short drying times.

It was also possible to ascertain that the green foils, or even the ceramic articles, produced according to the method of the present invention are re-emulsifiable. By re-wetting with water, a dispersion can be formed anew in which the ceramic is again distributed dispersively. This provides a possibility for recycling the ceramic powder utilized.

The special advantage of the polymer dispersion used is that, by varying its monomers, it can be adjusted to be variably flexible or brittle, mechanically strong or weak. The greater the quantity of powder, the stronger the product, i.e., both the monomer ratio and the ratio of powder quantity to polymer quantity determine the properties of the ceramic body in the final effect.

The basic concept of the invention, namely, the use of the special polymer for producing the dispersion, can be supplemented by additives. Thus, for example, it is possible to add a dispersant to the dispersion. Polyelectrolyte solutions or carboxylic acids in particular are advantageous for this purpose.

There is no restriction with respect to the ceramic powder used. Thus, siliceous, oxide or non-oxide ceramic powders can be employed. Their parts by weight in the dispersion is generally between 30 and 85 percentage by weight, however preferably over 70 percentage by weight. The non-oxide ceramic powders can be specially masked against hydrolysis. It is also possible to add a plasticizer to the dispersion, preferably between 1 and 15 percentage by weight relative to the solids content. Phthalates or polyhydric alcohols can be used as plasticizers.

The particle size of the dispersion is between 0.05 and 3.0 micrometers. Its transformation temperature lies between −40° C. and +20° C. To increase the flowability of the dispersion, a liquefier can be added in a quantity of 0.2 to 3.0 percentage by weight relative to the solids content.

The dispersion of the present invention is used primarily for producing ceramic foils, in that the dispersion is applied in uniform thickness onto a base with the aid of the doctor blade process, subsequently dried and sintered.

EXAMPLE

A ceramic powder is used whose aluminum oxide content is greater than or equal to 99.8 per cent. The average grain size is 0.5 micrometer. A 55 percentage binder dispersion is produced in which the particle size lies between 0.05 and 3.0 micrometers. A polyelectrolyte solution in a quantity of 1.5 percentage by weight is added as a dispersant. Glycerol in a quantity of 15% is used as a plasticizer. The slip is prepared with 70 percentage of solids. In this case, a liquefier made of polyacrylic acid is added in a quantity of 0.6 percentage relative to the solids content. The foils are poured in a thickness of 1.8 millimeters and are led into a drying tunnel. A green foil is formed which can be delaminated and is crack-free, non-porous and non-warping. It has the flexibility needed for its further processing.

What is claimed is:

1. In a method for producing a ceramic foil, from a castable slip made of a dispersion of a ceramic powder in a solvent, the improvement comprising
   mixing a slip comprising a ceramic powder and a non-organic solvent consisting of a water-based dispersion of an aqueous vinyl-acetate/ethene copolymer, having a monomer ratio of vinyl-acetate to ethene, to form a homogenous dispersion, and controlling or varying properties of the ceramic foil by adjusting i) the monomer ratio of vinyl-acetate to ethene in the water-based dispersion within a range from 95:5 to 75:25, so that foil softness increases with increased ethene quantity and foil hardness increases with increased vinyl-acetate quantity, and ii) ratio of powder quantity to polymer quantity, so that foil strength increases with increased powder quantity, the ceramic foil capable of being brittle;
   wherein a plasticizer of phthalate or polyhydric alcohol in an amount between 1 and 15 percent by weight relative to solids contents is added to the dispersion, the dispersion having a polymer constituent of 5 to 25 percent by weight relative to the solids content;
   applying the slip in a uniform thickness onto a solid base, followed by drying in a drying tunnel to produce a green foil that is crack-free, non-porous and non-warping.
2. The improvement according to claim 1, wherein the dispersion has a liquid content of 5 to 25 percent by weight relative to a solids content.
3. The improvement according to claim 1, wherein a green foil or ceramic article is produced which is re-emulsifiable.
4. The improvement according to claim 1, wherein a dispersant is added to the dispersion.
5. The improvement according to claim 1, wherein a polyelectrolyte solution or a carboxylic acid is added as a dispersant.
6. The improvement according to claim 1, wherein the ceramic powder is siliceous, oxide or non-oxide ceramic and comprises between 30 and 85 percent by weight of the dispersion.
7. The improvement according to claim 1, wherein the ceramic powder is siliceous, oxide or non-oxide ceramic and comprises over 70 percent by weight of the dispersion.
8. The improvement according to claim 1, wherein the ceramic powder is non-oxide and masked against hydrolysis.
9. The improvement according to claim 1, wherein the plasticizer is a phthalate.
10. The improvement according to claim 1, wherein a polyhydric alcohol is the plasticizer.
11. The improvement according to claim 1, wherein the dispersion has a particle size between 0.05 and 3.0 micrometers.
12. The improvement according to claim 1, wherein the dispersion has a transformation temperature between −40° C. and +20° C.
13. The improvement according to claim 1, wherein a liquefier in a quantity of 0.2 to 3.0 percent by weight relative to the solids content is added to the dispersion.
14. The improvement according to claim 1, wherein the dispersion is applied in uniform thickness onto a base, subsequently dried and sintered.
15. A method for producing a ceramic foil comprising
    mixing a slip comprising
        a ceramic powder whose aluminum oxide content is greater than or equal to 99.8% and having an average grain size of 0.5 micrometer; and
        a non-organic solvent consisting of an aqueous vinyl-acetate/ethane copolymer, having a monomer ratio of vinyl-acetate to ethene, to form a homogenous dispersion;
    adding 1.5 wt. % polyelectrolyte solution as a dispersant, 15 wt. % of glycerol as a plasticizer, and 0.6 wt. % polyacrylic acid as a liquefier;
    controlling properties of the ceramic foil by adjusting:
        i) the monomer ratio of vinyl-acetate to ethene in the water-based dispersion within a range from 95:5 to 75:25, so that foil softness increases with increased ethene quantity and foil hardness increases with increased vinyl-acetate quantity, and
        ii) ratio of powder quantity to polymer quantity, so that foil strength increases with increased powder quantity; the ceramic foil capable of being brittle;
    applying the slip in a uniform thickness of 1.8 millimeters onto a solid base with a doctor blade, followed by drying in a drying tunnel to produce a green foil which can be laminated and is crack-free, non-porous and non-warping.
16. A method for producing a ceramic foil consisting essentially of:
    mixing a slip comprising a dispersion of a ceramic powder in a non-organic solvent, wherein the ceramic powder is siliceous, oxide or non-oxide ceramic and comprises over 70 percent by weight of the dispersion, and the non-organic solvent consists of an aqueous vinyl-acetate/ethene copolymer, having a monomer ratio of vinyl-acetate to ethene, to form a homogenous dispersion;
    wherein a plasticizer of phthalate or polyhydric alcohol in an amount between 1 and 15 percent by weight relative to solids contents is added to the dispersion, the dispersion having a polymer constituent of 5 to 25 percent by weight relative to the solids content;
    controlling properties of the ceramic foil by adjusting:
        i) the monomer ratio of vinyl-acetate to ethene within a range from 95:5 to 75:25, so that foil softness increases with increased ethene quantity and foil hardness increases with increased vinyl-acetate quantity, and ii) ratio of powder quantity to polymer quantity, so that foil strength increases with increased powder quantity; the ceramic foil capable of being brittle;

applying the slip in a uniform thickness onto a solid base with a doctor blade, followed by drying in a drying tunnel to produce a green foil which can be laminated, is crack-free, non-porous and non-warping; and sintering the green foil.

* * * * *